United States Patent
Kelly et al.

[11] Patent Number: 5,756,055
[45] Date of Patent: May 26, 1998

[54] TWO PHASE FLUID HEAT EXHANGE

[75] Inventors: Brian J. Kelly, Corona, Calif.; Peter F. Roueche, Longview, Tex.

[73] Assignee: Uop, Des Plaines, Ill.

[21] Appl. No.: 735,760

[22] Filed: Oct. 23, 1996

Related U.S. Application Data

[63] Continuation of Ser. No. 387,075, Jul. 31, 1989, abandoned.

[51] Int. Cl.$^6$ ........................................................ B01J 8/04
[52] U.S. Cl. ........................ 422/194; 422/195; 422/224; 261/114.5
[58] Field of Search ............................. 422/108, 189, 422/190, 191, 193, 194, 195; 261/114.5, 224, 231

[56] References Cited

U.S. PATENT DOCUMENTS

| | | | |
|---|---|---|---|
| 3,259,380 | 7/1966 | Brown | 422/195 X |
| 3,342,193 | 9/1967 | Deering et al. | 137/3 |
| 3,378,349 | 4/1968 | Shirk | 422/194 |
| 3,480,407 | 11/1969 | Wentworth et al. | 422/194 X |
| 3,598,541 | 8/1971 | Nennemuth et al. | 422/194 X |
| 3,705,016 | 12/1972 | Ludwigsen et al. | 422/194 X |
| 3,787,189 | 1/1974 | Muffat et al. | 422/194 X |
| 3,824,081 | 7/1974 | Smith et al. | 422/194 X |
| 3,922,326 | 11/1975 | Yoshida et al. | 261/113 |
| 4,036,917 | 7/1977 | Slobodyanik | 261/114.1 X |
| 4,233,269 | 11/1980 | Kaye et al. | 422/194 X |

*Primary Examiner*—Christopher Kim
*Attorney, Agent, or Firm*—Thomas K. McBride; John G. Tolomei

[57] ABSTRACT

A prior art quench-type, direct contact, heat exchanger device used especially between catalyst beds in a reactor vessel, is modified to include a liquid-liquid pre-mixing baffle upstream of a gas-liquid heat exchange section. The pre-mixing reduces the fluid non-homogeneity experienced by current quench type heat exchangers in certain applications. The baffle not only pre-mixes non-homogeneous fluid stream portions, but provides a pair of liquid streams which impinge within the prior art heat exchange device. The pre-mixing and impingement improves the heat transfer process within the prior art device. The relatively low velocity liquid flowrate upon which the baffle operates minimizes any added pressure loss. The pre-mixing baffles also provide some acceleration and increased contact with the quench gas stream to further improve heat transfer with only a moderate effect upon the overall pressure drop across the device. The upstream baffle avoids downstream product liquid deviations caused by radial and lateral input liquid non-homogeneities while minimizing any added pressure loss.

12 Claims, 5 Drawing Sheets

TWO PHASE FLUID HEAT EXHANGE

CROSS REFERENCE TO RELATED APPLICATION

This application is a Continuation application of prior application Ser. No. 07/387,075, filed Jul. 31, 1989, abandoned.

FIELD OF THE INVENTION

This invention relates to fluid stream heat exchanger methods and devis. More specifically, the invention relates to direct contact heat exchange devices and methods which produce a cooled homogeneous fluid stream from a mixture of hot fluids and cooler gases within a multi-step reaction bed device and process.

BACKGROUND OF THE INVENTION

Many chemical industry devices and processes require quick cooling or quenching of a hot liquid stream in a reactor vessel. This can be accomplished by transferring unwanted heat from the liquid to a cooler gaseous stream in a direct contact heat exchange (or quenching) device within the reactor vessel. These cooling devices turbulently mix the cooler gaseous and hot liquid streams. The quick cooling or quenching may also involve mass transfer between the fluid streams. However, the processes of mixing and two phase contacting consume available energy, typically in the form of a pressure drop across the quenching device.

The primary objectives of a fluid quenching device/ process step within a reactor vessel are to: 1) reduce excess fluid temperatures generated in an exothermic reaction occurring within the reactor, 2) produce a homogeneous fluid phase temperature at near equilibrium conditions from input streams of a relatively cool gas and a hot non-homogeneous fluid; 3) minimize the pressure drop or other available energy loss; and 4) be able to handle a variety of input reactor fluid conditions. The quenching device should also be light weight, rugged in construction, reliable, and low in cost. The device should also be capable of several operational modes. These include a start-up mode, a reduced throughput operational mode, a design throughput mode, and a maintenance mode. A minimum of effort to convert from one mode to another is also desired.

Current liquid quenching devices may achieve some of these objectives, but other objectives may not be accomplished. Homogeneous fluid compositions and temperatures may not be produced, especially during off-design reactor conditions. The pressure drop may also be significant, again especially under off-design reactor fluid conditions.

Quick cooling of fluids is especially required between fixed catalyst beds within a reactor vessel. One method (and related devices and components) for interbed fluid cooling/ mixing is illustrated in the U.S. Pat. Nos.: 3,592,612; 3,342,193; and 3,502,455. These patents are directed to a mixed flow (cool gas-hot liquid) quench box within a reactor vessel between reaction beds. A collection tray radially conducts the hot liquid and gas from an upper catalyst bed to a pair of centrally located apertures or orifices. A cool gas is injected from a separate gas source at or near the two orifice entrances to the quench box. The quench box subjects the flows of hot fluids and cool gas to two phase flow acceleration, flow diversions, and flow impingement. This agitation mixes the cool gaseous and hot fluid streams, transferring heat from the hot gas and liquid. The two phase output stream flow at the quench box exit slows and a porous tray then distributes and feeds cooled liquid and gas to the next reaction bed.

Although these quench box devices produce satisfactorily cooled homogeneous fluids in many applications, they are deficient under certain input flow conditions. The devices may also consume significant amounts of available energy. The form of this consumption of available energy is a pressure loss across the gas injection nozzles and across the quench box. The pressure loss not only increases operating costs but also requires additional structures to withstand these pressure differentials across the quench box and the walls of the vessel.

SUMMARY OF THE INVENTION

A new apparatus, when added to the quench box heat exchanger device in a two phase downflow vessel, improves the production of a homogeneously cooled fluid stream without unduly increasing the pressure drop. The apparatus adds a series of liquid pre-mix baffles to a liquid and gas interbed collection tray at the quench box orifice entrance. The baffles pre-mix and redirect liquid flows from different positions on the collection tray by liquid sinuous flow and impingement and/or swirl induction upstream of the gas-liquid heat transfer accomplished in the quench box.

This added apparatus avoids the non-homogeneous product liquid problems which were found in certain past applications. Problems appear to be caused by hot spots, short circuits or fluid composition deviations coming from the upper reaction bed. The radially draining inflow on the interbed collection tray appears to segregate and set up a two phase annular flow condition at the quench box inlet orifices.

The pre-mix baffle series is attached to each of the quench box inlet orifices and primarily effects only the draining liquid stream. The baffle diverts hot liquid from one radial zone into other radial zones to obtain a homogeneous temperature hot fluid input to the quench box. The low liquid speed at this location and fixed baffle diversion requires little pressure drop and is effective under nearly all operating modes and reactor fluid flow conditions. The baffle's open shape and accessible location also simplify maintenance and repair.

The low fluid radial inflow velocities at the pre-mix device minimize any further pressure loss. This pre-mixing can also increase contact time with the quench gas stream, further improving heat transfer with only a moderate impact upon the pressure drop across the device/process step. One type of pre-mix baffle design splits the liquid flow, impinging the split flows at the center of the orifices. The impinging location still further improves heat transfer in the quench box with little increase in pressure loss.

BRIEF DESCRIPTION OF THE DRAWINGS

In these Figures, it is to be understood that like reference numerals refer to like elements.

DESCRIPTION OF THE PREFERRED EMBODIMENT

Figure 1:
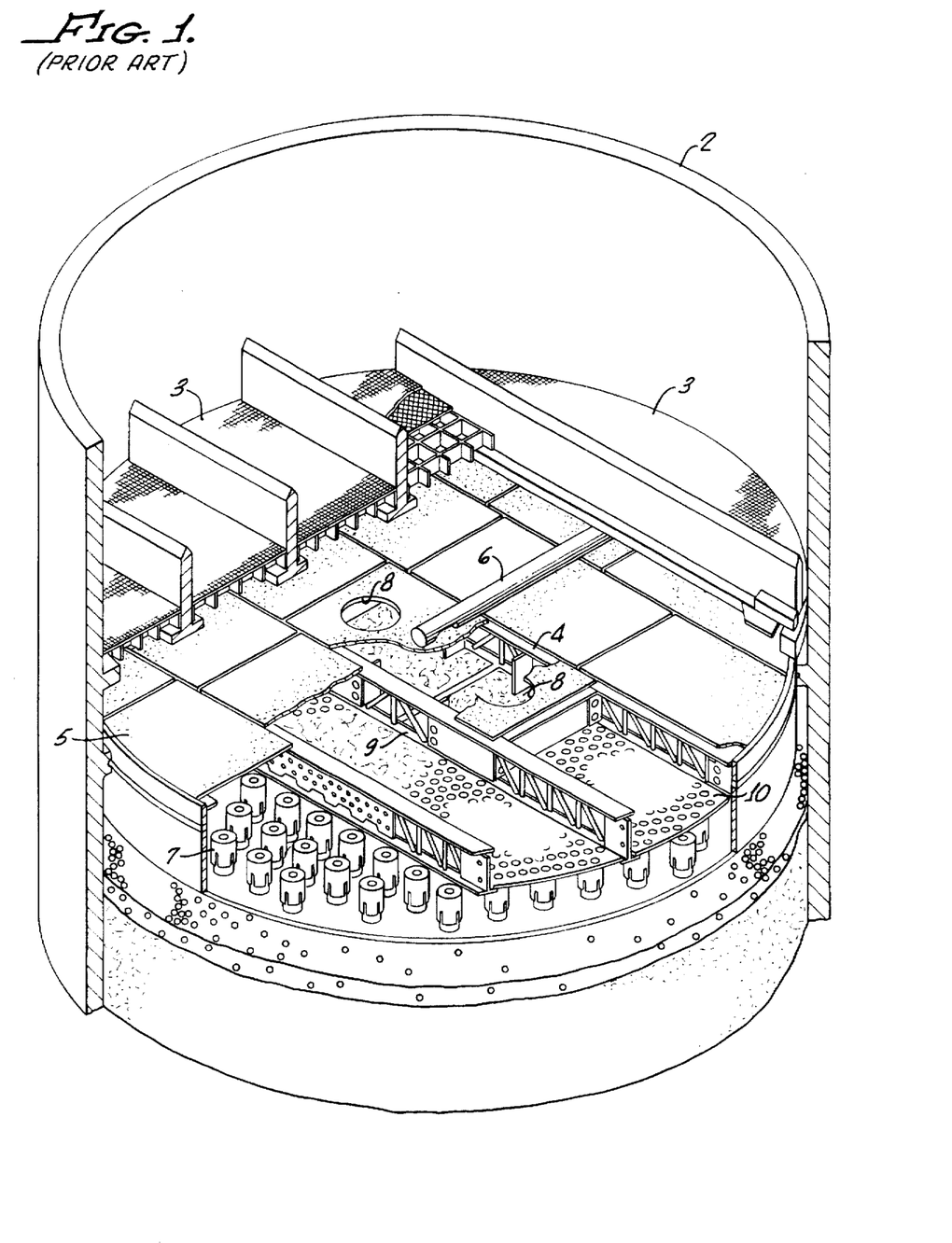
FIG. 1 shows an orthogonal view of a prior art quench box between reactor beds.

FIG. 1 shows a cut-away orthogonal view of a prior art quench box in a contacting bed or reactor vessel 2. Vessel 2 is a downflow reactor vessel containing a plurality of catalyst beds. An upper catalyst bed supplies a first or input fluid stream, usually a hot liquid and gas (not shown for clarity) onto a catalyst support screen or grid 3 of multi-bed reactor vessel 2. The hot liquid and gas from the catalyst support screen 3 flow downward into the upper portion of an interbed zone. The upper portion (the space between the catalyst support grid 3 and an interbed collection tray or barrier 5) of the interbed zone (the space between the upstream catalyst support grid and a porous rough distribution tray 10 of the downstream catalyst bed within the reactor vessel 2) is designed to collect the catalyst effluent (hot) gaseous and liquid flows. The collected hot fluids are rapidly cooled (i.e., quenched) by contacting with a cooler gas.

A cooling or quench flow of a second fluid, usually a cooler gas, is supplied from a quench gas nozzle and supply piping 6 to cool the hot fluids. The hot fluids at the support grid 3 result from an exothermic reaction in the catalyst bed (not shown). The collection tray 5 prevents this hot liquid and hot gas from downflowing to the next catalyst bed downstream of the distributor caps 7 within the multi-stage reaction vessel 2 before cooling these hot fluids. The fluid collection tray 5 forces all the hot liquid, hot gas, and quench gas into either of two orifices 8 (one of which orifices is completely shown in FIG. 1 and the other shown partially cut away for clarity).

The orifices form the two phase fluid inlet or entrance to the quench box 4. The hot liquid on the fluid collection tray 5 flows radially inward towards the centrally located pair of orifices 8. Test results and studies by the inventor have shown that the liquid tends to flow down around the periphery of the orifices 8, i.e., annular liquid flow. The gas phase flows downward through a central core of each orifice, thus radially segregating liquids entering on one side of the orifice from those entering on the other. The hot liquid is then accelerated by the restriction, mixing, and proximate contact with the downward (cooler) gas flow through the orifice pair 8. The shape of the quench box, its internal configuration, and outlet 9 force the fluids from orifices 8 to turn 90 degrees, impinge, and turn 90 degrees towards one portion of the walls of vessel 2. The acceleration, impingement, and mixed flow diverts, breaks up, and brings the hot liquid and cooler gas fluids in intimate contact to quench (i.e., quickly cool) the liquid. The mixed stream from outlet 9 slows and passes through the rough distribution tray 10. The porous rough distribution tray 10 distributes the cooled liquid and gas to the bubble cap distributor tray 7 and downstream catalyst bed.

The design pressure drop or differential across the quench box 4 based upon ⅕ scale model testing is 0.9 megadynes/cm² (1.25 pounds per square inch). The interbed support structure is designed to withstand an interbed pressure differential of 0.14 megadynes/cm² (2 pounds per square inch).

Although this quench box design affords satisfactory results in most applications, the inventor has determined that the quenching device is subject to specific problems. The first problem is that of non-homogeneous product liquid temperature apparently caused by segregation of input liquid streams having different temperatures and flowing into the quench box orifices 8 from different locations. Radial and lateral temperature differences across the upstream reaction bed and catalyst support grid 3 can cause the input liquid in one radial sector of the collection tray to be hotter than at other radial sectors. The radial and lateral distribution of upstream reaction bed liquids may also have different compositions at different locations. The flowrate of liquid from each radial sector may also vary, especially if upstream reaction bed short circuits exist.

These non-homogeneous temperature, composition and flowrate inputs to the quench box are normally corrected by cooling and mixing in the quench box. However, under certain hydrodynamic conditions, these radial non-homogeneities are not completely corrected in the quench box. For example, the gaseous stream may not sufficiently cool a larger amount or a hotter liquid input at one collection tray quadrant, overheating a portion of a downstream reaction bed.

Another problem with the current quench box design is the ability to handle off design flowrate conditions. An off design (reduced) flowrate also reduces the velocity and therefore the turbulence, mixing, and heat transfer within the mixing/quench box device. The reduced flowrates can also aggravate temperature deviations and non-homogeneous fluid production caused by hot spots or short circuits in the reaction beds.

Testing of an interbed quench box scale model has confirmed that severe liquid product output deviations (in composition and inferentially in temperature) can exist. Deviations were caused by laterally and radially non-homogeneous inputs and liquid segregation at the quench box inlet, especially at off-design flow conditions. After injecting a dye at various radial locations in the interbed quench box scale model (approximately ⅕ the size of a commercial device), the measured deviations in output concentrations of dye ranged from 32 to 80%. At 60% of the design flowrates, measured deviations increased to as high as 145%.

Figure 2:
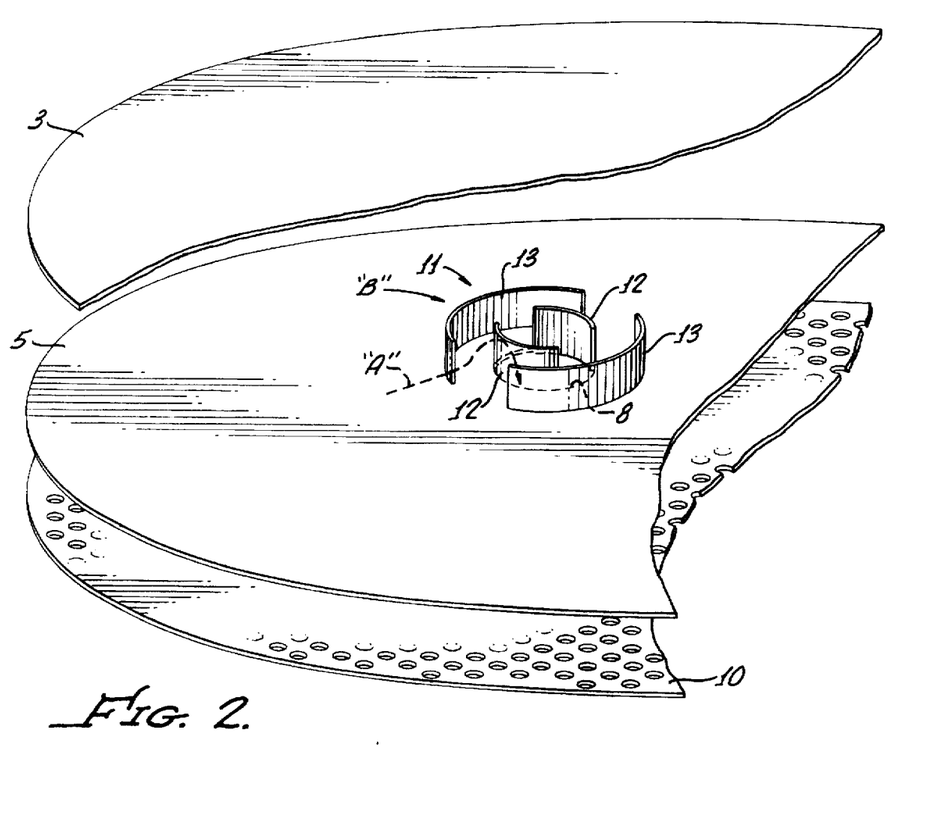
FIG. 2 shows a perspective front view of an "open-top" pre-mix baffle device embodiment of the invention.

To overcome these problems, the present invention provides various "pre-mix" devices. FIG. 2 shows a schematic front view of an "open top" pre-mix device 11 attached to the fluid collection tray 5 proximate to the inlet (port) of the pair of prior art quench box inlet orifices 8. Fluid collection tray 5 extends across the entire circular cross section of the reactor or contacting vessel 2 (see FIG. 1). The fluid collection tray 5 forms the bottom of an input conduit diverting all fluids to the two quench box orifices 8. Pre-mix device 11 includes a pair of curved, interior baffles 12 and a pair of curved, exterior baffles 13 attached to the collection tray. The two pairs of fluid flow baffles do not extend to fill the height of the upper portion of the interbed zone (the distance from the collection tray 5 to the support grid 3). The less than full height baffle pairs allow generally unimpeded gaseous flow in the upper (gas flow) portion of this common inlet channel or interbed zone.

The baffles are placed in the lower or liquid flow portion (zone) and primarily to divert a portion of the liquid flow. The exterior baffles 13 divert a portion of the radial liquid inflow "A" (shown as a dashed sinuous arrow for clarity). The combined portions of liquid flow in a sinuous passage running along the top face of the collection tray 5 (or in the liquid zone) between the baffles. The diverted flow premixes with other portions of the liquid inflow in the sinuous passage prior to entry into one of the orifices 8.

In the preferred embodiment, the baffles are higher than the expected height of the liquid inflow on the collection tray. However, other embodiments may provide "open-top" baffles in which liquid spills over the top of one or more baffles. The flow cross-sectional area of the "open-top" baffles is less than the orifice cross-sectional area.

Although two pairs of baffles are shown, only one pair may be required in other embodiments if radial variations in the input liquid flow streams are not severe. The pre-mix baffles homogenize the radial stream property variations prior to the higher velocity (and higher pressure drop) mixing portions of the prior art quench box. After leaving quench box 4 (see FIG. 1), the cooled liquid passes through the rough distribution tray 10.

Gas flow is relatively unimpeded to the one orifice 8 shown in FIG. 2. A radial gas inflow stream line "B" (shown as a solid arched arrow) is generally above (or in the gas zone portion of the interbed zone) the liquid level. Thus, the gas reaches the orifice generally unimpeded in this "open-top" embodiment shown in FIG. 2. This is especially true if only one baffle is employed or a gas injection nozzle (see FIG. 1) is directly over each of the orifices. An alternative "open-top" embodiment (see FIG. 6) places a single cylindrically shaped baffle having a single opening attached to each inlet orifice 8. The openings face each other, so that previously radially inflowing liquid is now flowing radially outward (i.e., in a direction originating from the center of the reactor) at the orifice inlet. As the radially outflowing liquid flows in the side of the quench box inlet orifice, the radially inflowing gas flows from the opposite side and through the liquid stream.

Figure 3:
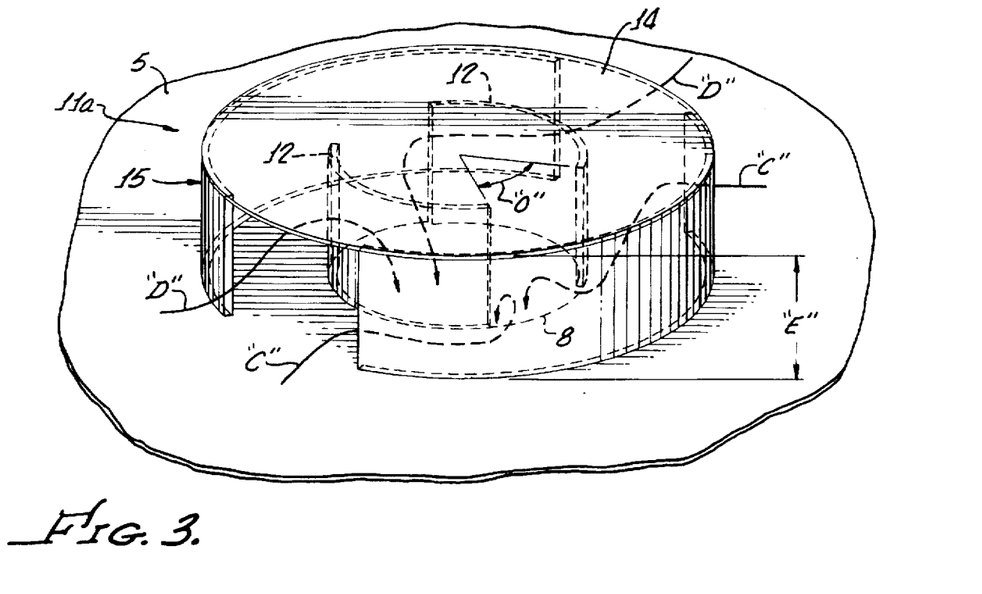
FIG. 3 shows a perspective front view of a "covered-top" pre-mix device embodiment.

FIG. 3 shows a front schematic view of a "covered-top" liquid pre-mix device 11a, which is the preferred embodiment of the invention. The pre-mix apparatus again attaches to the fluid collection tray 5 near one or more of the orifices 8. The vertical exterior baffles 15 and vertical interior baffles 12 (hidden and shown dotted for clarity) are attached to and covered by a horizontal top cap 14 to form the "covered-top" pre-mix device 11a.

The baffles and top cap 14 have a more significant effect on the gaseous flow, but maintain phase segregation upstream of the quench box. Segregation is shown in FIG. 3 by the radial streamline liquid inflow portions "C" within the lower or liquid zone (streamlines shown as arrows, dashed when hidden from view for clarity) and radial streamline gaseous inflow portions "D" (initially above the liquid inflow "C") in the gas zone. The segregated liquid and gas phases each pre-mix with other similar phase portions before entering the orifices 8. Gravity and the low velocity liquid flowrate at these locations tend to maintain the separate fluid phases within the sinuous passages and also tends to minimize pressure loss. The baffles and attached top cap 14 at a height of "E" does not allow a direct radial fluid flow path from any point on fluid collection tray 5 to the orifice 8.

The dual baffle openings to the orifice of the interior baffle pair also create two opposing liquid streams just upstream of the orifice entrance. The opposing liquid streams impinge near or at the center of the orifice. The impingement helps to break up the liquid stream into droplets for improved contact surface area and heat exchange with the cooler gas which follows the flow paths "D." The liquid flow velocity may also locate the impingement within the quench box. The flow diversion and center impingement avoid the initial liquid-on-edge, gas-in-center (i.e., annular flow) segregation in the prior art radial inflow orifice entrance configuration.

The reason for this prior art liquid-on-edge liquid segregation appears to be related to the liquid and gas velocities at this point and radial liquid inflow patterns.

The sinuous baffle passage dimensions can be selected to provide additional fluid contact time without significantly accelerating the fluids or causing added pressure loss. The passage dimensions may also be easily changed by altering the height "E" for different applications. For example, a reduction in height "E" provides moderate acceleration and additional significant heat transfer added to the high acceleration profile of the quench box (see FIG. 1). In alternative embodiments, the top cap 14 or vertical baffles may be louvered or ported to reduce pressure losses and improve the separate phase pre-mixing of the gaseous or liquid phases.

The primary objective of the pre-mixing is to combine liquid radial flow stream portions with streams from other radial positions to avoid non-homogeneous liquid deviations from entering the quench box orifices. The sinuous flow and impingement result in relatively uniform properties of the cooled liquid phase at the prior art quench box exit. The baffles premix hot and cooler gas streams to also obtain relatively uniform properties of the segregated gaseous phase entering the quench box when a "covered-top" embodiment is employed.

The interior and exterior baffle openings form a staggered series of inlet and outlet ports to the pre-mix device in the preferred embodiment. The openings are shaped and dimensioned to prevent a straight line gas "D" or liquid stream path "C." This requires an opening segment angle "O" less than one quadrant (90 degrees) wide. The angular opening segment angle "O" in other embodiments may vary widely, depending upon the number of baffles, number of baffle openings, and the degree of sinuous flow desired.

In the preferred "covered-top" embodiment, height "E" can typically range from 25 to 100 percent of the diameter of each orifice 8. In the embodiment shown in FIG. 3, the height "E" is equal to approximately ½ the diameter of each orifice 8 (see FIG. 1). This also provides that height "E" is normally higher than the anticipated liquid level on collection tray 5. Opening segment angle "O" for each baffle pair ("O" shown in FIG. 3 only for the interior baffle pair for clarity) can range from zero (e.g., a low dam forcing liquid flow over the top) to nearly 360 degrees (e.g., a single baffle). In the preferred embodiment shown in FIG. 3, the opening segment angle "O" for the exterior baffle pair is 60 degrees, and 75 degrees for the interior baffle pair.

Figure 4:
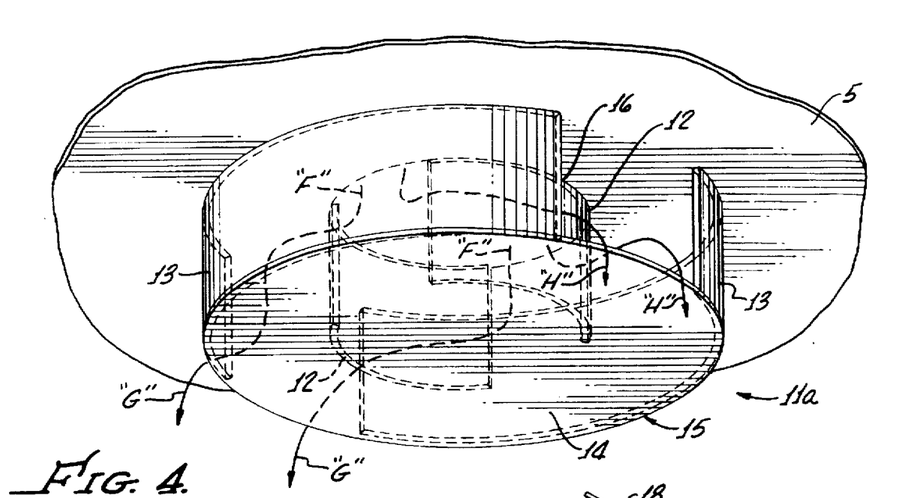
FIG. 4 show a side perspective view of an inverted mixing baffle device, which is useful as a replacement for prior art quench boxes.

FIG. 4 shows a side schematic of a mixing device, which is similar in construction to the pre-mix device 15 shown in FIG. 3. Although structurally similar, the inverted downstream attachment serves, not as a pre-mix device, but as a mixing device. In effect, this inverted mixing device replaces the prior art quench box or it may be installed as one of a pair within the interbed zone at each orifice 8. It may be used not only for concurrent flow operation as discussed above, but also in a counterflow application (gas and liquid flowing in opposite directions through the orifice 8).

The orifice interface area 16 in this application is attached at the bottom (i.e., underneath) of one of the orifices 8 (not shown for clarity in this view) rather than the inlet as shown in FIG. 3. The height "E" (see FIG. 3) of the interior baffle 12 may be extended to protrude into the orifice 8. The mating protrusion accomplishes force fit attaching, locating and centering the orifice interface area 16 of the baffle 11a to the bottom of the orifice in a single step.

The primarily liquid downward flow stream "F" (shown as arrows, dashed when hidden) is sinuous. The liquid flow is not allowed to exit in a straight line, being blocked by one of the baffles, 12 and 15, or the inverted top cap 14. This sinuous radial outflow exit path and orientation tends to first mix liquid and gaseous phases, then slow (at expanding radial flow cross-sections) and separate the liquid from the gas. The primarily liquid downflow portion "G" (shown as arrows, dashed when hidden) now flows along the inverted top cap 14. Counterflow gaseous flow stream "H" mixes with flow stream "F" before exiting out the orifice interface area 16.

The common structure of the pre-mix and mix devices 11a allows retrofit of malfunctioning quench boxes to be quickly accomplished. Common structure also requires minimal spare part storage, since one part can function for two applications.

Figure 5:
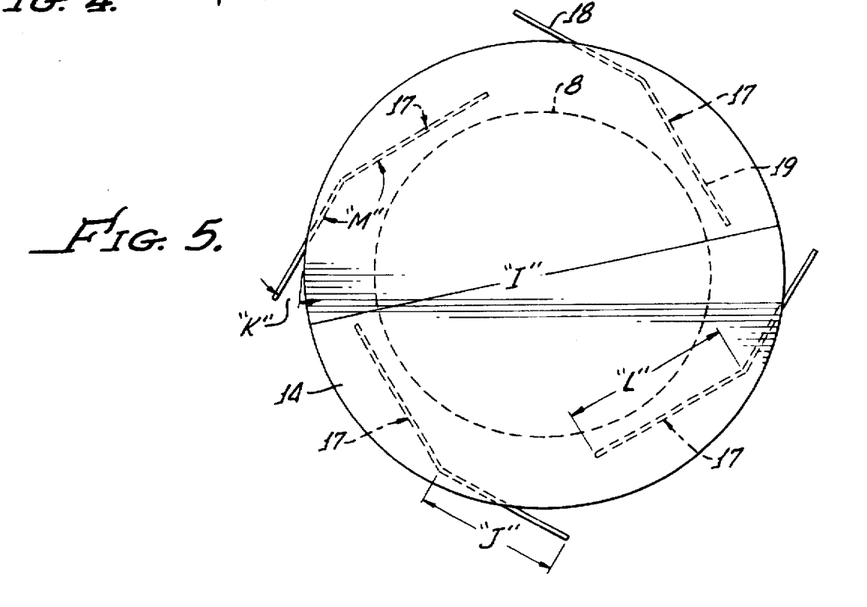
FIG. 5 shows a top view of an alternative pre-mix baffle device.

FIG. 5 shows a top view of an alternative embodiment of a "covered-top" pre-mix device. Each of a series of swirl baffles 17 extend from beyond the outside diameter "T" of top cap 14 to proximate to the inlet of one of the orifices 8. The swirl baffles have an outside swirl inducing section 18 and an interior swirl inducing section 19. These swirl inducing sections create a swirl in the radial liquid inflow, pre-mixing portions of liquid with other portions of liquid, preventing non-homogeneous flow streams. The outside section 18 has a length "J" oriented at an angle "K" to the tangent at the outside diameter of the top cap 14. The interior swirl section 19 has a length of "L" and is oriented at a swirl angle "M" relative to the outside swirl section.

The angles and swirl section lengths are selected to produce rotating or swirling gaseous and liquid stream flows entering the orifice 8. The swirl baffles maintain segregated liquid and gas stream flows upstream of the quench box, but pre-mix these stream flows to obtain homogeneous liquid and gas inputs to the quench box. The placement and attachment of the baffles to the collection tray 5 (not shown for clarity in FIG. 5) and the open area between baffles ensure full liquid flow diversion and pre-mixing without significant pressure loss.

In the preferred embodiment, the diameter "T" can range from 150 to 300 percent of the orifice diameter, angle "K" can range from 0 to 45 degrees, "J" can range from 0 to 2.3 "T", length "L" can range from 0 to ⅔ "L" and swirl angle "M" can range from 90 to 180 degrees. In the embodiment shown, the diameter "T" is 167 percent of the orifice diameter, angle "K" is 23 degrees, length "L" is 45 percent of "L", "J" is 15 percent of "L" and swirl angle "M" is 156 degrees.

Still other alternative configurations and embodiments of the invention are possible. One can alter the height "E" of each vertical baffle, rather than having identical baffle heights. The horizontal top cap 14 may be attached to only one of the two sets of baffles and may also extend beyond the outside (vertical) baffle. In other alternative embodiments, the top cap 14 can cover only the horizontal area within the interior baffles or cover to a point between the interior and exterior baffles. Swirl baffles may be combined with sinuous flow baffles to create another alternative embodiment. Besides solid, louvered or ported construction, the baffles and top cap may also be of porous or mesh construction, tending to mix and divert liquid flows having higher surface tensions than gaseous stream flows.

In still other embodiments, a plurality of baffles could have more than two opening segments. A single opening segment baffle (at each orifice) could be oriented to face or oppose each other. These orientations may re-direct the liquid stream away from the orifice center-line, providing added opportunities for impingement, break up, and improved heat transfer within the orifice.

Placement of the preferred premixing device is just upstream of the inlet orifices to the quench box. This placement allows simple attachment (press fit vertical baffle extensions into the orifices). The placement also allows the pre-mix devices to split and impinge homogeneous liquid streams into the center of the orifices. The separate liquid and gas pre-mixing and impingement work synergistically with the quench box, maximizing intimate contact and homogeneously efficient heat exchange. The pre-mixing in combination with mixing within the quench box removes lateral and radial liquid non-homogeneities of temperature, composition and flow.

Combining the pre-mix device with the quench box satisfies the need for a mixing device which reliably produces a uniformly cooled liquid without a significant increase in pressure drop. The pre-mix device enhances liquid mixing by eliminating liquid segregation caused by two phase annular flow at the quench box inlet. Minimum pressure drop within the pre-mix device is achieved by selecting the optimum flow area and/or clearances for each of the phases, and avoiding turbulent mixing of the phases. The baffles also cause the liquid to split into impinging stream portions. Liquid impingement occurs at the center (previously the gas flow portion) of each orifice. This avoids prior art phase separation in the orifice (liquid-at-edges, gas-in-middle) and breaks up the liquid stream into droplets to increase gas contact area and further improve heat transfer.

The invention is illustrated by the following example:

EXAMPLE 1

Figure 6:
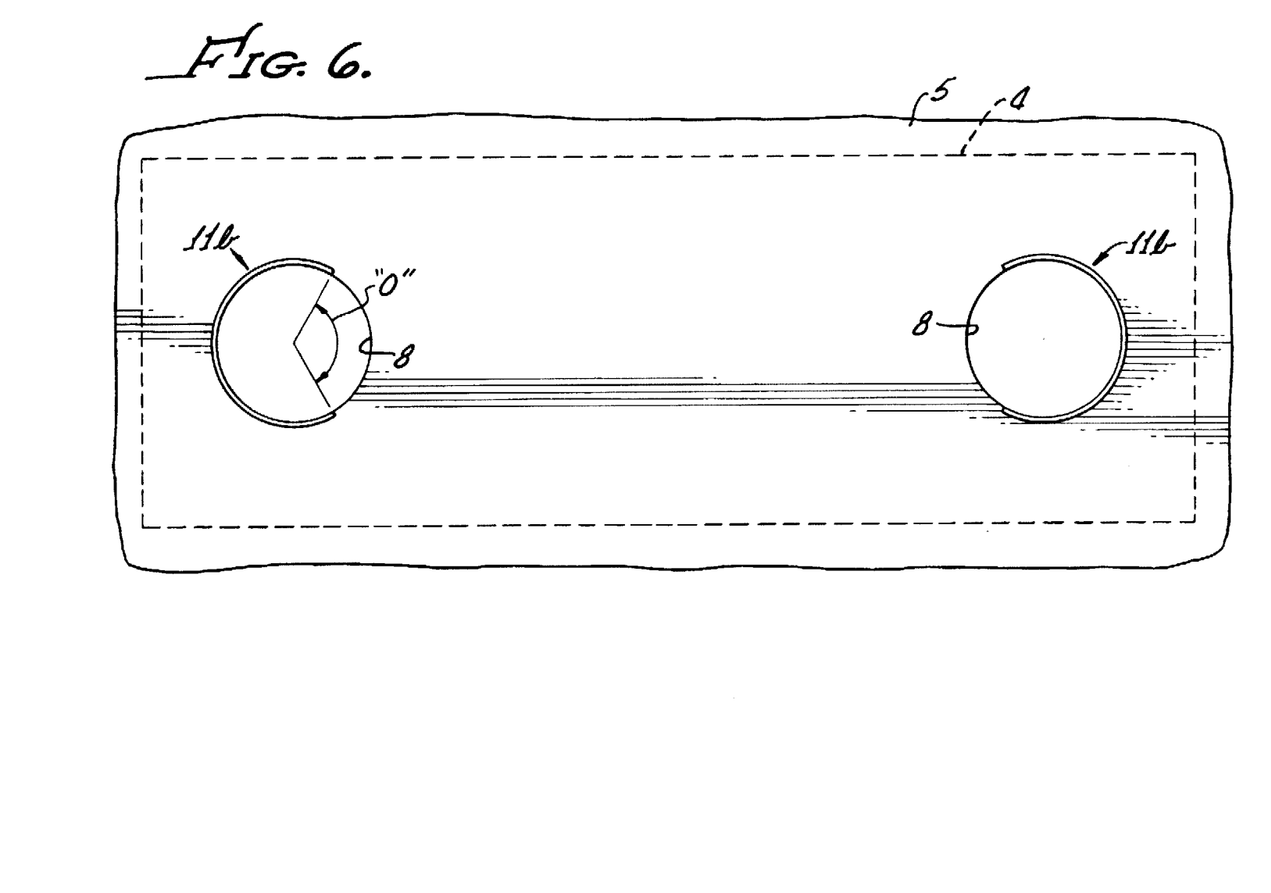
FIG. 6 shows a top view of a pre-mix test model embodiment.

Reduced product liquid deviations were measured on an interbed and quench box model ⅕th the scale of a commercial reactor quench box, which model was previously used to determine the causes of the problems observed with the prior art (See prior discussion and FIG. 1). A pair of single baffle "open-top" pre-mix devices was fabricated and attached to the pair of orifices. A top view of the devices is shown in FIG. 6. These devices were generally similar to the alternate "open-top" baffle configuration described above, except at ⅕ of commercial scale. The "open-top" vertical baffle 11b included an opening segment angle of 120 degrees, and the baffle was attached to the top of each orifice 8 of quench box 4 (see FIG. 2).

Testing of the ⅕ scale pre-mix devices shown in FIG. 6 and attached to a ⅕ scale quench box was similar to the testing of the prior art quench box described above. Dye was injected into the test liquid flows at various radial and lateral locations of the liquid collection tray. Product liquid average dye concentration deviations from the mean at the scaled design flowrate, ranged from 9 to 26 percent. At 60 percent design flow, measured deviations ranged from 41 to 70 percent. The projected increase in commercial pressure drop was determined to be on the order of 0.034 megadynes/cm$^2$ (0.5 pounds per square inch).

Therefore, the addition of a pre-mix device to the tested quench box dramatically improved the homogeneity of the product liquid (deviations reduced by ½ or more). However, the pre-mixing only moderately increased the pressure loss when compared to test results for the quench box alone. Although heated liquid and cooler gases were not employed in this ⅕ model example and therefore heat transfer effectiveness was not determined, the pre-mix device can also be expected to improve heat transfer performance and reduce deviations under a similar range of flow conditions.

In addition to the performance (reduced deviation and only slightly increased pressure loss) advantages, other advantages of the present invention are evident. These include: single step centering and attachment to the quench box orifices; ability to use the device as either a pre-mix or stand-alone mixed phase contacting (having concurrent flow or counterflow) device, supplementing or replacing the prior art quench box; ability to retrofit existing interbed quench box installations, the baffles being small enough to fit in the existing interbed area; prevention of overheating or other damage to downstream catalyst beds from inhomogeneous flow streams; and ability to easily tailor premixing/mixing effect and pressure drop for a variety of different commercial applications by adjusting the height or diameter of the baffles.

While the preferred embodiment of the invention has been shown and described, and some alternative embodiments also shown and/or described, changes and modifications may be made without departing from the spirit and scope of the invention or defined by the appended claims.

What is claimed is:

1. An apparatus especially useful in a downflow reactor vessel, said apparatus comprising:
   a) a tray for collecting a liquid fluid in a reactor vessel, said tray having one or more openings for draining said liquid below said tray;
   b) means for providing a gaseous fluid to said openings;
   c) means for causing a portion of said liquid collecting on said tray and said gas to follow a sinuous and circumferential path to said opening while maintaining said fluids substantially unmixed with each other and
   d) means for mixing said gaseous fluid and said liquid downstream of said opening.

2. The apparatus of claim 1 wherein said means for causing is located proximate to one of said openings.

3. The apparatus of claim 2 wherein said means for mixing comprises a quench box downstream of at least one of said openings.

4. An apparatus for mixing a first fluid stream and a second fluid stream, said apparatus comprising:
   a) a substantially open multi-fluid flow conduit having a first fluid entry port, a second fluid entry port, and at least one multi-fluid exit port;
   b) first means for pre-mixing a portion of said first fluid stream in a sinuous path with another portion of said first fluid stream while passing at least a portion of said second fluid along said sinuous path and forming within said conduit a pre-mixed first fluid stream substantially unmixed with said second fluid; and
   c) means for mixing said pre-mixed first fluid stream and said second fluid stream, said mixing means located at or downstream of said multi-fluid exit port.

5. A fluid property exchange apparatus comprising:
   a) a fluid conduit;
   b) means for providing a first fluid stream within said conduit together with a second fluid stream within said conduit;
   c) available-energy-consuming means for pre-mixing a portion of said first fluid stream with another portion of said first fluid stream to form, within said conduit, a premixed first fluid stream generally separate from said second fluid stream;
   d) available-energy-consuming means for transferring a fluid property from said first fluid stream to said second fluid stream; and
   e) wherein said available-energy-consuming means for pre-mixing is shaped and dimensioned to consume-less available energy than the available energy consumed by said available-energy-consuming means for transferring.

6. The apparatus of claim 5 wherein said available-energy-consuming means for transferring is shaped and dimensioned to transfer heat from one of said fluids having a higher temperature than the other fluid.

7. A fluid flow apparatus within a fluid containing vessel comprising:
   a) a tray for collecting a liquid fluid stream in said vessel, said tray having one or more openings for draining said liquid below said tray;
   b) means for providing a gaseous fluid stream to said one or more openings;
   c) means for mixing said gaseous and said liquid fluids downstream of said openings;
   d) means for splitting said liquid stream into at least two liquid stream portions and located upstream of said openings, said splitting means shaped and dimensioned to generally maintain said liquid stream portions unmixed with said gaseous fluid; and,
   e) means for impinging one of said liquid stream portions onto another liquid stream portion within an impingement zone, said impinging means attached to the upstream edge of said openings and configured to generally maintain said liquid stream portions and said gaseous stream unmixed when said gaseous and liquid portion streams are upstream of said impingement zone.

8. The apparatus of claim 7 wherein said means for impinging is shaped and dimensioned to locate said impingement zone downstream of said openings.

9. The apparatus of claim 8 wherein said means for impinging is shaped and dimensioned to locate said impingement zone proximate to said openings.

10. The apparatus of claim 9 wherein said means for mixing comprises a second means for impinging which is opposingly attached to one of said openings.

11. A fluid stream mixing apparatus for exchanging heat between a first fluid stream and a second fluid stream, said apparatus comprising:
   a) a generally open multi-fluid flow conduit having at least one multi-fluid exit port;
   b) a baffle within said conduit, said baffle shaped and dimensioned to pre-mix a portion of said first fluid stream with another portion of said first fluid stream to form a pre-mixed first fluid stream generally unmixed with said second fluid at said exit port; and
   c) a direct contact multi-fluid mixing device connected to said exit port, said mixing device shaped and dimensioned to exchange heat between said pre-mixed first and second fluid stream.

12. The apparatus of claim 11 which also comprises a means for separating the mixed fluid streams, said-separating means located downstream of said mixing device.

* * * * *